United States Patent [19]
Walker

[11] Patent Number: 4,742,532
[45] Date of Patent: May 3, 1988

[54] HIGH SPEED BINARY DATA COMMUNICATION SYSTEM

[76] Inventor: Harold R. Walker, 78 Oliver Ave., Edison, N.J. 08817

[21] Appl. No.: 861,049

[22] Filed: May 8, 1986

[51] Int. Cl.[4] ............................................. H04L 27/18
[52] U.S. Cl. ........................................ 375/50; 360/44; 375/43; 375/57; 375/60; 375/61; 375/77
[58] Field of Search ........................ 375/50, 52, 56, 57, 375/61, 77, 81, 83, 60, 121, 43; 455/42, 47, 109, 202, 204; 360/30, 40, 43, 44; 332/9 R, 16 R, 23 R, 44; 329/104, 122, 123; 330/295, 303, 306; 333/167, 175, 178

[56] References Cited

U.S. PATENT DOCUMENTS

| | | | |
|---|---|---|---|
| 3,075,151 | 1/1963 | Murray | 330/303 |
| 3,108,261 | 10/1963 | Miller | 360/44 |
| 3,141,066 | 7/1964 | Cotterill | 375/50 |
| 3,235,855 | 2/1966 | Woo | 360/43 |
| 3,646,534 | 2/1972 | Miller | 360/44 |
| 3,706,936 | 12/1972 | Krohn | 330/306 |
| 3,835,386 | 9/1974 | Court | 375/50 |
| 3,980,824 | 9/1976 | Lamb et al. | 375/50 |
| 4,322,850 | 3/1982 | Antonini et al. | 375/81 |

Primary Examiner—Benedict V. Safourek
Attorney, Agent, or Firm—Arthur L. Plevy

[57] ABSTRACT

There is disclosed a high speed data transmission system for transmitting a binary data signal over a communications path. The binary data signal is clocked at a given period. The system comprises encoded means responsive to a binary NRZ input data signal to provide at an output an encoded digital signal having time periods greater than multiples of the clock period, whereby the encoded signal occupies a lesser effective bandwidth than the NRZ signal would occupy. There are balanced modulator means having an input responsive to the encoded signal and another input adapted to receive a carrier frequency to provide at an output a double sideband suppressed carrier signal. Coupled to the output of the balanced modulator are narrow bandwidth filtering means including first low pass and second high pass parallel filter paths each having a common input terminal coupled to the output of the modulator. The ouputs of the low and high pass filters are symmetrically combined to provide a narrow single sideband signal for transmission characterized in that transitions between binary levels in said encoded signal are manifested by distinct phase changes in said single sideband signal.

19 Claims, 8 Drawing Sheets

HIGH SPEED BINARY DATA COMMUNICATION SYSTEM

BACKGROUND OF THE INVENTION

This invention relates to communication systems and in particular to a communication system which is capable of transmitting binary data in a reliable and efficient way.

As is well known, based on prior communication techniques, there is a great deal of art related to the transmission of binary data. Essentially, the prior art was concerned with the effective bandwidth required to transmit binary data with minimum error. There have been various schemes which serve to conserve bandwidth as related to the transmission of binary data over conventional communications links. In any event, in order to transmit binary data, it is known that the transmission bandwidth in such systems has to be as wide as the effective bandwidth of the data that is being transmitted. Thus, the prior art employed conventional types of transmission procedures including amplitude modulation, frequency modulation and several other techniques.

Also according to the prior art, single sideband suppressed carrier modulation was employed to transmit the binary data in an effort to reduce the effective bandwidth. Utilizing such single sideband transmission techniques as those techniques employing band pass filtering and suppressed carrier modulation, one had to restore the carrier in exact phase and frequency. These systems required that there be minimal phase shift in the band pass to avoid data distortion. The prior art suffered from many disadvantages in the use of single sideband transmission systems and such systems are not widely employed for the efficient transmission of such data except over "High Frequency" or "Short Wave" circuits.

In regard to transmission systems, a very well known technique is employed for rating transmission efficiency. The rating scheme was devised by Nyquist and is known as the Nyquist 1, 2 Criterion. The efficiency is expressed in bits per cycle of bandwidth. Some typical figures utilizing this rating are as follows. For a base band NRZ (non-return to zero) system, there is a Nyquist Criterion of 2. When one employs a modulated carrier such as an amplitude modulated carrier, this system has a Nyquist Criterion of 1. In a single sideband carrier system where one employs only one sideband, the Nyquist Criterion is 2.

There is a signal encoding technique which is referred to as MFM or Miller Encoding. This encoding technique is widely used in computer disc recording to narrow the bandwidth required by the head and media. The system uses a series of rules to determine when a voltage change is to be made. For example, during a 1, the voltage will change at the center of the bit. During a 0, the voltage will change at the end of the bit. When a 1 follows a 0, the change is delayed until the center of the 1. The overall format employed in the MFM or Miller Encoding System employs bit widths of 1, 1.5 and 2.0. Ignoring the spectral content of the square corners in the frequency analysis, the time periods involved are 2, 3 and 4 times the clock period. In an ideal situation, only those frequencies resulting from those periods need to be used since the original wave form can be restored from them. This is a encoding technique which results in a considerable bandwidth savings and as indicated, is widely employed. Thus, in an MFM single sideband system where one employs one sideband, the Nyquist Criterion can be made to equal 4 with suitable filtering. In a quaternary single sideband system, which is a four phase system, the Nyquist Criterion is also equal to four.

As one can see from the above, the MFM single sideband system or the quaternary SSB system affords a transmission improvement of 2 times over base band NRZ or the single sideband carrier system, while it gives an improvement of 4 times over the typical AM modulated carrier system. As will be described, the present invention enables one to achieve a Nyquist Criterion of 6 utilizing and employing the techniques to be described and relating to the present invention.

It should be obvious from the above description that single sideband transmission combined with improved encoding, for example as the MFM system and filtering, greatly improves the efficiency of a communication system. Since a narrower bandwidth is also employed, it will also improve the signal to noise ratio. As will be explained, the system described herein, which employs a unique encoding technique, utilizes periods of 2.0, 2.5 and 3.0 times the clock period so that a band pass filter can be narrowed more than that utilized in an MFM system. Thus, an efficiency which is 50% greater is achieved since the period difference is 2-3 instead of 2-4.

As will be explained, the system to be described herein utilizes three unique features which are not known to be incorporated in any other communication systems and which enables the system to operate more efficiently and more effectively than other prior art systems. The system to be described has particular relevance to telemetric systems including FM/SSB subcarriers and also has applications in sending digital data on FM broadcast station subcarriers, through narrow band communication receivers, local area networks and data over voice telephone exchanges. Thus, the system to be described employs a newly conceived technique that enables data to be sent at efficiencies of 6 bits per cycle of bandwidth (Nyquist efficiency). The system is usable in all radio and cable systems, but has a primary use for FM/SCA systems where up to four high speed data channels can be transmitted within a single FM station subcarrier space. These channels can be 38.4, 19.2, 19.2 and 19.2 KB channels offering several times the utilization capability of the SCA spectrum when compared to a 38.4 KB FM/FM system. Alternatively, four audio and one high speed data channel can occupy the same space. As will be further explained, it is also usable in communication radio systems where 38.4 KB data can be passed through a standard 455 KHz IF system bandwidth.

Essentially, a main advantage of the system to be described is the complete elimination of the carrier. The carrier is completely eliminated at the transmitting end and does not have to be recovered at the receiving end. This technique alone results in a great savings of bandwidth and also reduces receiver complexity. Unlike conventional single sideband suppressed carrier systems, carrier reinsertion is not required and all the disadvantages of such systems are circumvented. As is well known in single sideband binary data transmission systems, there are many disadvantages associated with the same. The first disadvantage is that there is low frequency distortion based on the isolation of one of the sidebands and there is a great deal of distortion which is provided by carrier reinsertion for coherent detection at the receiver. The concept of transmitting a signal without a carrier has been investigated in the prior art. See for example, U.S. Pat. No. 3,835,386 issued on Sept. 10, 1974 entitled Binary Data Communication Apparatus and issued to Frederick C. Court. This patent describes a system for single sideband transmission of binary data. The apparatus comprises a coder which converts a binary data sequence to a related code sequence. There are gate circuit means with a carrier signal generator and a band pass filter. The related code sequence and carrier signal are applied to the gate circuit so that the related code sequence gates the carrier signal through to the output. The output of the gate circuit comprises bursts of carrier signals. The gate circuit is further arranged so that alternate bursts of carrier signals are in anti-phase relationship with each other. These carrier signal bursts are applied to a band pass filter. The response of the filter is such that when a half bit duration burst is applied to it, the output is a burst of oscillations of twice the bit duration rising from 0 amplitude to maximum during the first bit period and falling again to 0 in the second bit period. The filter's output is an amplitude dipolar angle modulated signal which only occupies a single sideband and purportedly can be detected at the receiver by a simple envelope detector. There are a great many difficulties encountered when one tries to employ this technique.

The difficulty with this system is that the filter means as described offers a uniform phase shift with frequency. Thus, the patent indicates a phase shift occurring with time which is absolutely contrary to the fact that such filters do not exist. In order for the system as described in that patent to function, one must have 180° phase shift differences at all frequencies involved. This is also not obtainable. The modulation means creates signals varying in frequency according to the relationship $F_c + F_m$, where $F_m$ is equal to $1/T$, where T is the time between pulses. Hence, to pass the lowest and highest frequency required, $F_c$ must be at one edge of the filter and $F_c + F_m$ (the highest value of $F_m$) at the other edge. It is possible utilizing only one value of $F_m$ to obtain a 180° phase shift, but not all values.

Depending upon the number of zeros transmitted, $F_m$ will vary from 0 HZ upwards. Therefore, the 0 signal crossings predicted in the patent do not occur. Furthermore, while a filter at the transmitter might give 180° phase shift at one frequency, the transmission path requires a plurality of filters. These filters will destroy all phase relationships as created at the transmitter. Thus, any total phase difference of 30° or more from the ideal will completely destroy the signal as far as 0 envelope crossings are concerned rendering the system inoperative or extremely difficult to implement. Hence, as indicated, there is a substantial problem involved with such systems and therefore such systems have not been commercially exploited or employed.

As will be described, in the present invention, data is pre-encoded in a narrow band width format as in a MFM or other format. The data as applied to the modulator is NRZ of bit widths equal to or greater than one bit width. The system employs a standard balanced modulator which is commonly used and of the type which suppresses the carrier as will be explained. The system requires a special filter having 0° phase shift across its passband, which is unique, and enables one to remove all signs of the carrier in conjunction with the modulator. The pre-encoded and the modulator filter removes all lower base band signals thus requiring a bandwidth ¼ or less than that required by a double sideband communication system. Because perfect zero crossovers and perfect 180° phase changes are not achievable and therefore envelope detection cannot be used, phase detection means is employed by the system resulting in a reduced bandwidth by a significant factor, which results in more efficient use of the radio spectrum. Because of the narrow bandwidth, the signal to noise ratio is greatly improved resulting in an increased range and improved noise immunity.

The system employs further techniques to achieve further noise reduction. The detector means is not synchronous or any way dependent upon the carrier frequency. Envelope zero crossings are not essential at all. Phase differences other than 180° are completely detectable and in practice, differences of plus or minus 45° from the ideal do not result in any significant errors. The system is centered on detectable phase changes and has no need to set a particular clipping level as is taught in the above-noted reference. In fact, another difficulty regarding the system as described above is that it will not function if a plus or minus 45° variation in phase from the ideal were received.

It also should be apparent as one can ascertain from the prior art, that the majority of systems which have been described and discussed, require a synchronous carrier detector means in order to regenerate the carrier at the receiving site, which this system does not.

DETAILED DESCRIPTION OF THE FIGURES

Figure 1:
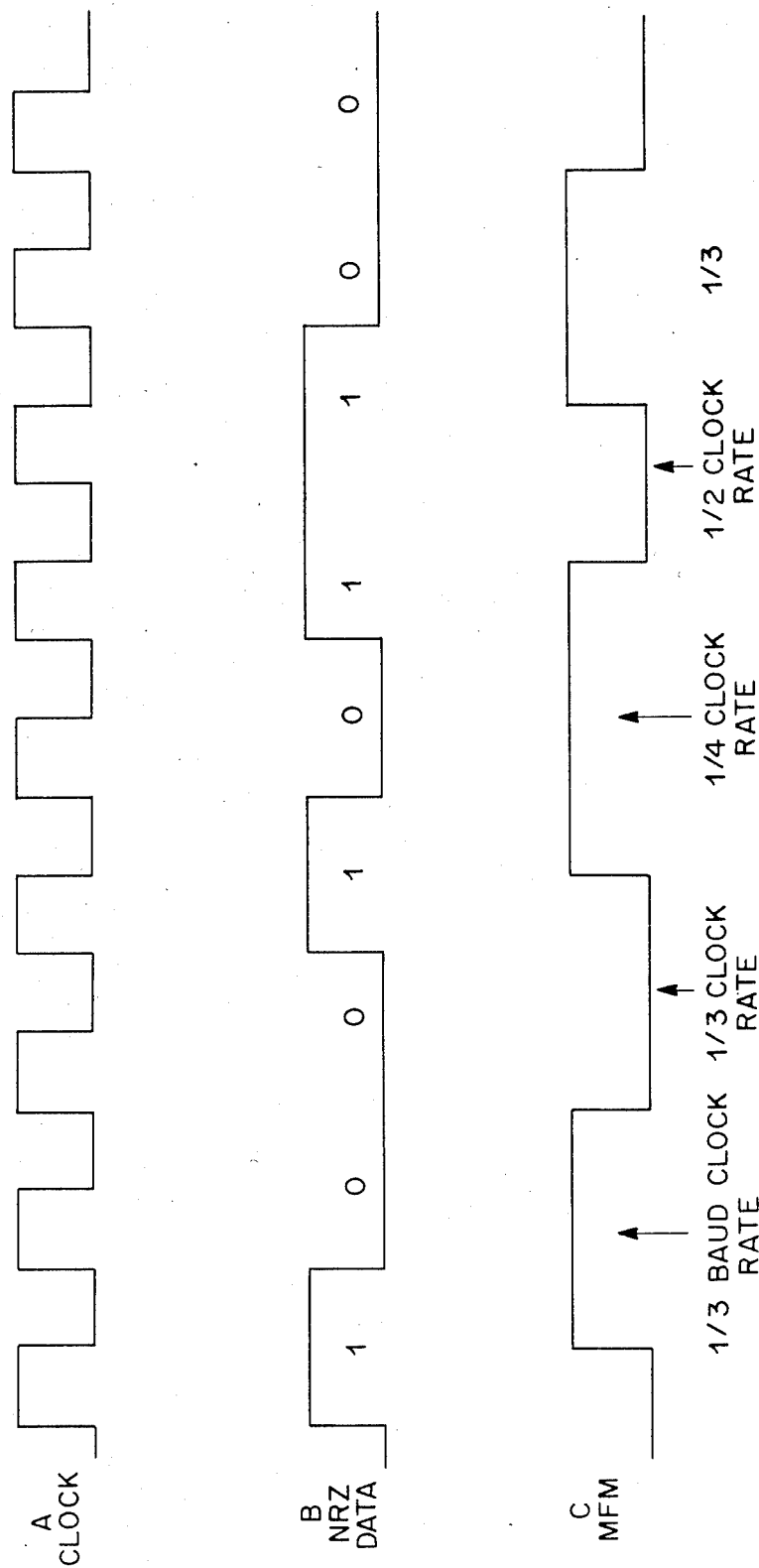
FIG. 1 is a series of timing diagrams useful in explaining the operation of this system.

Referring to FIG. 1, there is shown typical wave forms involved in a typical data communication system. A of FIG. 1 shows a typical clock signal where data is clocked out as a series of ones and zeros as shown in the NRZ (non-return to zero) diagram of FIG. B. The non-return to zero signal or NRZ of FIG. 1B is a widely employed signal which is used in data communications as well as in recording of data on magnetic tape. As was explained above, the non-return to zero or NRZ signal is characterized in that there is no transition except at the leading edge of a bit that is changed. The NRZ technique is well known and has been fully described in the literature.

NRZ data is difficult to record on tape and transmit over long wires or radio systems since it has a frequency spectrum ranging from 0 to one half the clock frequency. Even wider frequency requirements are imposed if the original wave form is to be preserved. To correct for this, various encoding/decoding methods are used to eliminate the need as explained above for low frequency response. Typical of these is the MFM or Miller Encoding which is widely used as indicated above. Shown in FIG. 1C is a typical signal using modified Miller or MFM encoding in which the relationship between FIGS. 1B and 1C should be evident. The techniques for providing the MFM system have been described in the Background of the Invention and has been further shown in FIG. 1C with relation to a typical NRZ signal.

Figure 2:
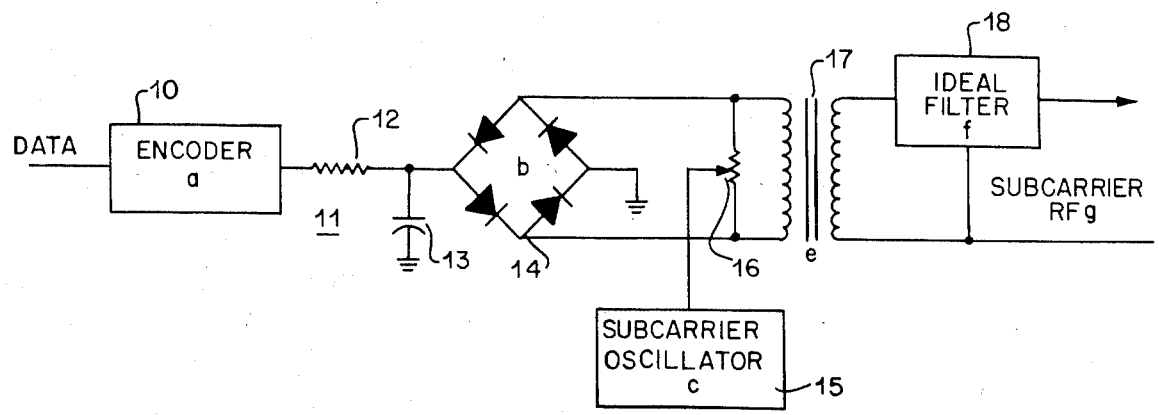
FIG. 2 is a simple block diagram showing the basic components of the system according to this invention.

Referring to FIG. 2, there is shown a simple block diagram of the system to be disclosed. Essentially, the digital data is passed through an encoder 10. The encoder 10 converts the digital data to an MFM signal or to a Walker encoded signal as will be further explained. The use of the term Walker Encoding is attributable to the invention herein and is a typical way of describing a new encoding technique such as Miller Encoding. Miller Encoding or MFM is well known in the art and there are many examples of typical encoding devices which can be employed according to MFM operation for encoder 10. The output of the encoder is passed through a RC network 11 which consists of a resistor 12 and a capacitor 13. Essentially, the resistor and capacitor serve as an integrator whereby the output of the encoder is passed through the RC pair to reduce the abruptness of transitions through 0 volts. Equal positive and negative swings are applied to a balanced modulator 14 of conventional design. Balanced modulators such as modulator 14 are well known in the art. See, for example, a textbook entitled *Single Sideband Principles and Circuits* by E. W. Pappenfus et al., McGraw-Hill Book Company (1964) Chapter 5 entitled "Balanced Modulators". It is of course understood that the modulator 14 is sometimes designated as a ring modulator and is employed to create a double sideband suppressed carrier signal with sidebands centered around the frequency determined by the subcarrier oscillator 15. Semiconductor chips are also available to perform this function. The subcarrier oscillator 15 has its output applied to a balancing potentiometer 16 to therefore enable one to adjust the system to null out any residual carrier. The techniques for making such a balanced modulator as well as techniques for balancing the same are well known.

In a practical embodiment of the structure shown in FIG. 2, the output of the encoder would be at a 38.4 KB rate with the subcarrier oscillator operating for example at 108 KHZ. Thus, at the transformer 17, the signal contains the sidebands which are the carrier frequency plus or minus the envelope frequency of the data, which as indicated in the case of encoded data, relates to the bit rate or baud rate by the factors given above. The output also contains sizable third, fifth and higher order harmonics and is therefore quite broad in terms of spectral utilization. The output of the transformer or the secondary winding is coupled to an ideal filter 18. Essentially as will be described, the filter 18 is a special filter of unique design that has as close to uniform phase shift as possible and a bandwidth as close to that of an ideal filter as possible. It is known and indicated that filters of formal design such as the Butterworth, Chebychev, Synchronous and so on are not suitable for this operation since they do not exhibit uniform phase shift characteristics.

As will be explained, it is not possible to design a filter which is free of all phase shift and still retain narrow bandwidth characteristics. The filter to be described and employed with this invention approximates such an ideal filter but does not have a flat amplitude response and does exhibit some phase shift at the edges. Hence, a compromise must therefore be made to obtain minimal phase shift within the best allowable bandwidth, the pass band being as narrow as possible to improve the signal to noise characteristics.

The bandpass of this filter is one half or less of the frequency spectrum including the carrier frequency and a single sideband. It specifically rejects the carrier and all frequencies below the lowest frequency resulting from encoding, plus all third, fifth and higher harmonics resulting from encoding and modulation.

Figure 3:
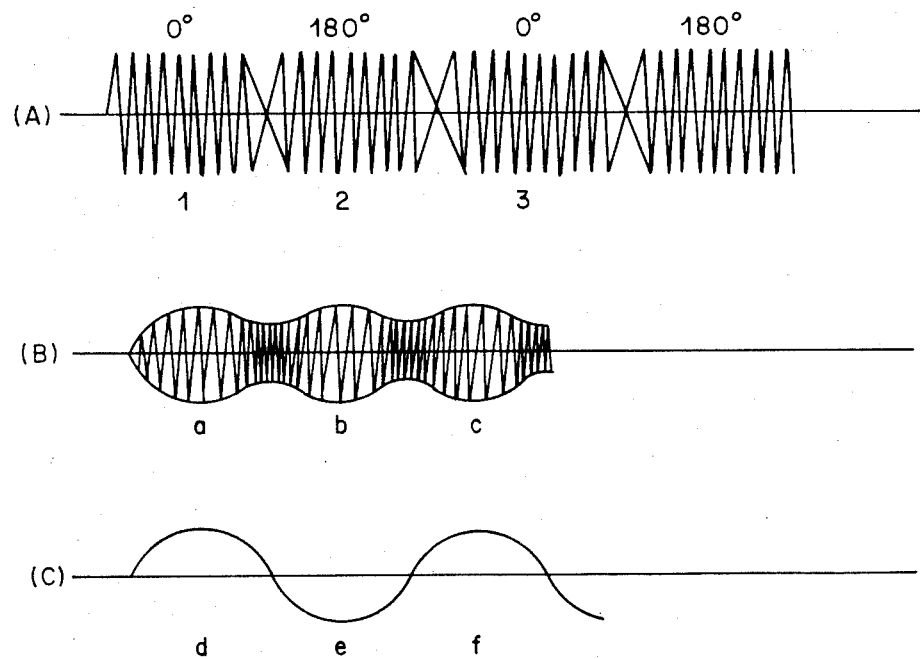
FIG. 3 is a series of timing diagrams depicting various wave forms useful to explain the system operation.
Figure 4:
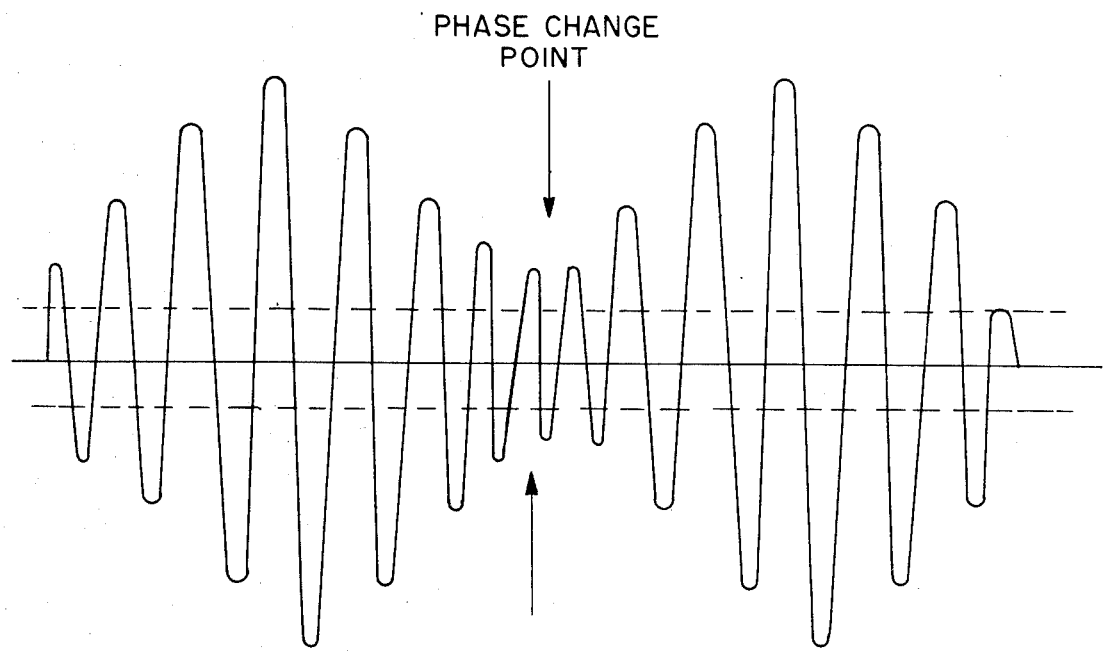
FIG. 4 is a timing diagram showing an output wave form as generated by this system.

Referring to FIG. 3A, there is shown the data signal which has been modulated by means of the circuit employed in FIG. 2 as seen at transformer 17. The wave form of FIG. 3B is indicative of the wave form obtained after passing through the narrow bandpass filter according to this invention which essentially is shown in FIG. 2 as the ideal filter 18. It will not be uniform in amplitude and phase changes occurring at the points between 1, 2 and 3 of FIG. 3A will not be exactly 180°. The dips may be as low as 25% of the peak value as shown in FIG. 3B. Following FM and PM practice, this envelope can be limited or clipped to remove all noise spikes and variations in amplitude. Such a limited signal would closely resemble FIG. 3A with an area of phase confusion between part 1, 2 and 3.

Referring to FIG. 3C, the following information is pertinent. Conventional detectors utilize a reinserted carrier and retrieve a signal as for example shown in FIG. 3C. This signal replicates the orginal with the corners rounded. That is because all harmonics are removed. This signal is then restored to the original signal by the use of a 0 crossing detector which then restores the signal to base band. As indicated above, there are at least two problems associated with the prior art techniques. First, the carrier must be recreated in phase and frequency which is an extremely difficult if not impossible task. Secondly, all filters which are employed must be free of phase shift or the data will be badly distorted.

Figure 5:
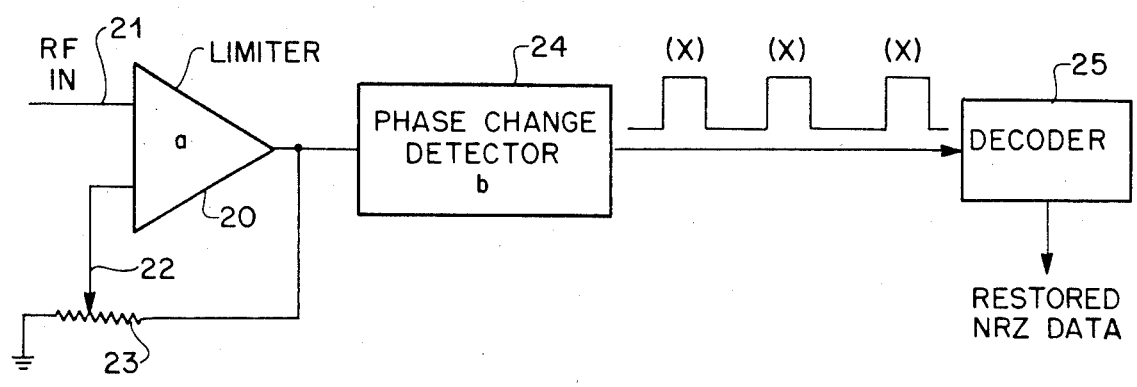
FIG. 5 is a simple block diagram showing a decoding system according to this invention.
Figure 6:
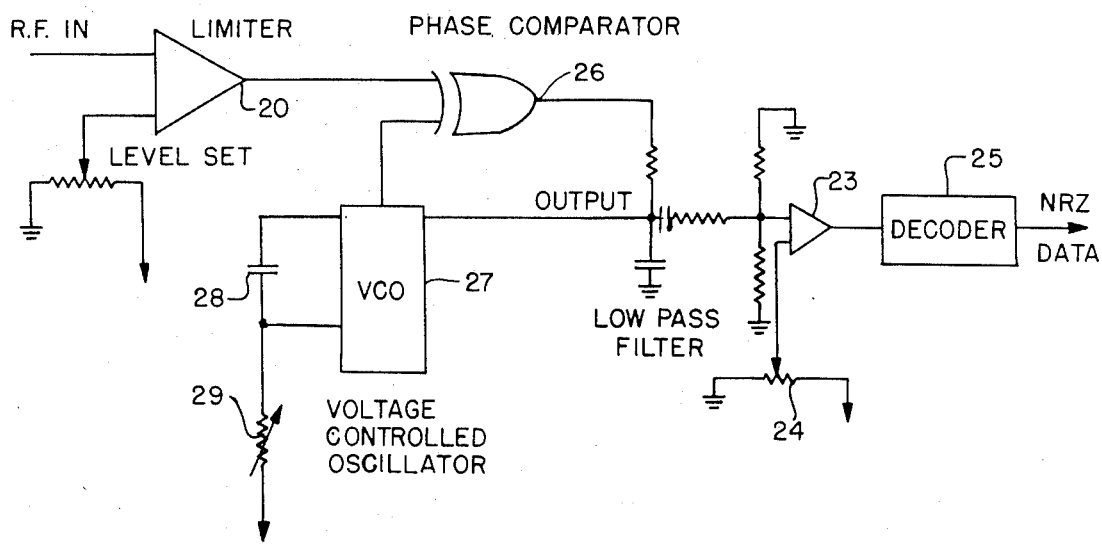
FIG. 6 is a simple block diagram showing a detector employed for use with this invention.

Reference is now made to FIG. 5 which shows the detector employed to detect the signal generated by the structure of FIG. 2. The detector shown in FIG. 5, as will be indicated, is unique in that it utilizes the sideband energy to recreate the original signal, but does not require reconstruction of the carrier to do so. The carrier is never required to accurately restore the data and there is no need to worry about carrier frequency, phase or which sideband is being used. In fact, the carrier could well lie within the pass band of another carrier signal when multiple signal channels are employed. This of course results in a great economic benefit to manufacturers and to users of the system. Thus, as seen in FIG. 5, the generated RF signal which is the signal shown in FIG. 3B is applied to the input of a limiter 20. Limiter 20 is a conventional integrated circuit component and essentially will pass a signal exceeding a given amplitude at input 21 depending upon the setting of the gain threshold at input 22. The gain threshold setting is conventionally determined by means of a potentiometer 23. The output of the limiter is coupled to a phase change detector which is shown in FIG. 6. The output of the phase change detector is a series of pulses as shown in FIG. 7b which can be decoded by a conventional decoder 25 to obtain the restored NRZ data. As indicated, such circuits are extremely well known to those skilled in the art.

Referring to FIG. 6, there is shown the phase change detector 24 of FIG. 5. Essentially as seen, the RF signal is applied to the limiter 20 as described in conjunction with FIG. 5. The output of the limiter is applied to an OR gate 26 which has another input obtained from a voltage controlled oscillator or VCO 27. The phase comparator and voltage controlled oscillator, or VCO may also be a conventional component such as that supplied by the RCA Corporation and sold under the designation 4046. The frequency of the oscillator is controlled by an RC network which is coupled externally to the VCO 27 consisting of a capacitor 28 and a variable resistor 29. In a particular embodiment, the VCO is tuned to a lower sideband, which in the example given above is a frequency between the limits of 89 and 97 KHZ, a carrier of 108 KHZ being used, but suppressed. The output of the VCO 27 is a square wave at the above-noted selected frequencies. The detector as shown in FIG. 6 appears to be a conventional phase lock loop, but as will be explained, it is not. A conventional phase lock loop detector requires a carrier just as any other conventional single sideband detecting scheme. The detector of FIG. 6 has no carrier upon which to lock and hence must endeavor to follow the sidebands alone which represent the modulating frequency time periods. Each change is sideband frequency is accompanied by a nearly 180° phase shift. Used in this manner, the circuit is set to respond within 2 or 3 cycles of the input. Essentially, the circuit does not follow or reproduce the signal envelope, but responds only with a pulse that marks each major phase change. The detector is therefore a phase change detector and not a phase lock and loop in the conventional tracking mode.

Figure 7A:
FIGS. 7a, 7b, and 7c depict a series of wave forms useful in explaining the operation of the detector on FIG. 6.
Figure 7B:
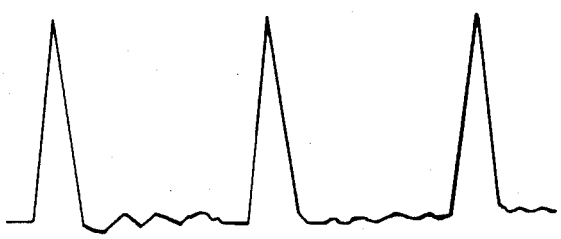
Figure 7C:
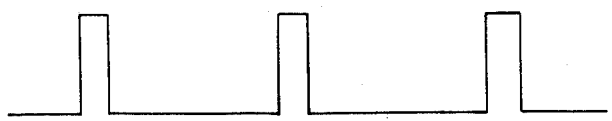

Referring to FIG. 7a, there is shown an input RF signal prior to limiting. FIG. 7b shows the output of the detector, designated as output in the FIG. 6. The output of the phase comparator is applied to a low pass filter and then to a conventional decoder 25 as shown for example in FIG. 2 obtain the original NRZ signal. Prior to application of the output of the comparator to the decoder 25, the signal of FIG. 7b is applied to an operational amplifier 23 arranged as a clipping circuit to remove noise, where the clipping level is adjustable by means of the potentiometer 24. The output of amplifier 23 is shown in FIG. 7c. Use of a conventional phase lock loop would result in an output which resembles the output shown in FIG. 3C. As one can see from FIG. 7b, the output of this detector is completely different. This detector is tuned to the sideband filter band pass and does not follow the envelope but essentially creates pulses when the phase changes. The RC low pass filter at the output is used to reduce the RF and noise components only. The decoder 25 which may be a microprocessor used for MFM or Walker decoding can be constructed to accept a wide variation in the phase change position so that the effects of noise on the limited signal are further minimized. The data distortion which results can be corrected in a microprocessor program as will be further explained. This is particularly advantageous when only a few cycles are present between phase changes as in the case when the baud rate approaches the carrier frequency. A conventional FM or PM detector of the envelope type will cause errors much more easily than the abrupt phase change detector shown in FIG. 6, especially in the presence of noise or when only four or five cycles represent a bit of data.

The detector shown in FIG. 6 has employed some of the advantages of the phase lock loop and therefore exhibits some noise immunity. Suitable filtering and limiting, if necessary, can also be used to reduce jitter when the time period of the data approaches that of the carrier frequency. The output of the detector is then used to create pulses which are employed by the decoder 25 which then restores the data to its original form (FIG. 1B). It is also indicated that at no time is any effort made to restore the data wave form directly from the RF signal as would be done in a conventional single sideband system.

Signal reconstruction is implemented by digital means after detecting the almost instantaneous change in phase. As indicated above, the filter is made as narrow as possible to accommodate the bandwidth required to transmit a proper signal. Narrowing the bandwidth of the system also results in improvements in signal to nosie ratio compared with wider bandwidth systems. By employing the filter with the characteristics to be described, one can improve the low level signal to noise ratio by as much as 10 decibels (10 dB.)

Figure 8:
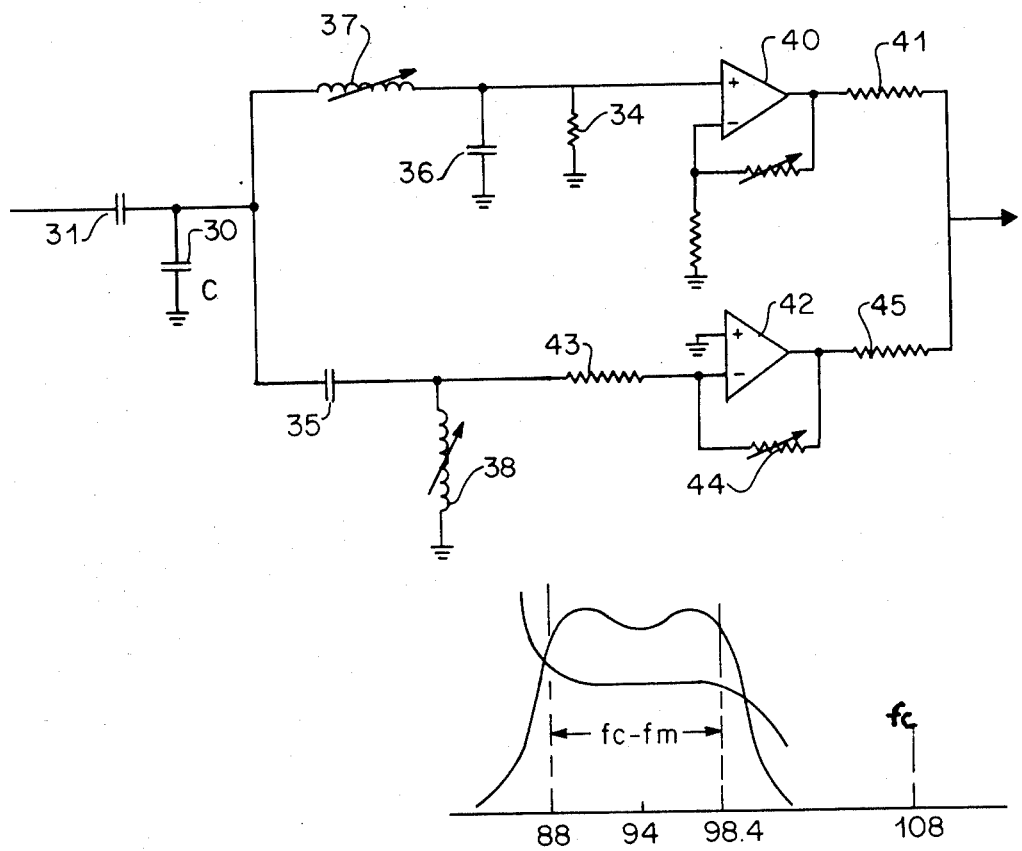
FIG. 8 is a block diagram showing a unique filter according to this invention.

Further improvement can be expected from the use of the phase change detector with limiting and as will be explained, the signal can also be processed by a microprocessor which will handle distortion. The filter configuration is shown in FIG. 8 and as indicated is extremely critical. Essentially, located below the filter schematic is a typical representation of the band pass K (gain) together with the phase characteristics of the filter which is essentially shown in a conventional format. For the system to function, distinct almost 180° phase shifts are required at all the frequencies involved. As an example, MFM encoded 19.2 KB data signals will have frequencies ranging from 4.8 KHZ to 9.6 KHZ above and below the carrier frequency. At any point in time, there must be a shift from high to low sideband frequency, or to an intermediate frequency, without losing the 0° to 180° phase shift relationship.

Ordinary filters, as indicated above, such as the Butterworth, Chebychev, Synchronous and so on involve a multiplicity of LC circuits that induce unacceptable phase shifts which destroy the nature of the signal. It is not possible to create the signal with very little phase shift with these types of conventional prior art filters.

The filter shown in FIG. 8 has been devised to provide 0 phase shift across the pass band while also causing the band pass filter to exhibit a sharper band pass characteristic. The filter functions as follows. The signal from the modulator which is shown in FIG. 2 is passed through the secondary winding of the transformer 17. This transformer 17 is coupled via a capacitor 31 to capacitor 30 of FIG. 8. The capacitor 30 is large in comparison to any capacitor in the resonant circuits. In the case of the circuits shown, it is ten times larger than capacitor 31 and ten times larger than the resonant capacitors 35 and 36. This capacitor 30 is shared by two resonant circuits operating at different frequencies and must be large to minimize inter-reaction. A resistor of very low value could also be employed. Any excessive interactions will destroy the filter's phase shift characteristics. As indicated in FIG. 8, two signal paths are provided. A first signal path is through a low pass filter consisting of variable inductor 37 and capacitor 36 which are resonated or tuned to an upper frequency limit, for example, which in regard to the embodiment described above, may for example be 95 KHZ. A second path is provided through a high pass filter consisting of capacitor 35 in series with variable inductor 38. The high pass filter is tuned to the lower frequency limit, which for example may be 93 KHZ. These filters as consisting of inductor 37 and capacitor 36 for the low pass filter and capacitor 35 and inductor 38 for the high pass filter are not loaded so as to preserve the Q. Hence, they operate as series resonant circuits and operate independently of one another. A signal larger than that coming from the input source will appear at the input to the amplifiers 40 and 42. The gain of the amplifiers is adjusted in a conventional manner by the resistors coupled from input to output as shown in the schematic. This signal level is approximately Q x the incoming signal. Where Q is the quality factor of the resonant circuits.

The amplifiers 40 and 42 are used to provide very high input impedance to avoid lowering the Q of the resonant circuits. At the same time, the amplifiers provide a very low output impedance to permit resistive mixing of the two signals. The gain of each amplifier is made adjustable to balance the two outputs. The amplifiers 40 and 42 are conventional operational amplifiers available in integrated circuit form and sold through many vendors. As indicated, the series circuits as consisting of coil 37 and capacitor 36 and coil 38 with capacitor 35 are stagger tuned and adjusted in Q to provide the desired band width. At frequencies giving a phase shift of more than 45° above and below resonance, the signals at the mixing resistors 41 and 45 are nearly equal in amplitude and cancel in phase. Therefore, they accentuate the sharpness of the band pass filter giving greater than expected selectively for a four pole filter. The filter is therefore an active filter dependent upon passive circuit elements to function. At frequencies near resonance, with the elements slightly stagger tuned, the phase shifts to ±90° in the two resonant circuits. One op amp 42, inverts its signal, so the signals appear at resistors 41, 45 in phase and adding. As the frequency varies above and below the center, the phase shifts away from in phase, but in opposite directions, i.e., one going positive, the other negative. Since they are added, the effect is to cancel phase shift until the skirt of the filter is reached. Over a narrow range, the two signals are additive and result in a summed output of uniform phase shift (flat phase shift). An abrupt phase departure from uniformity occurs at the −6 db points on the pass band's shoulders. The filter gain and phase characteristics as indicated are shown in FIG. 8 below the filter. The humps or peaks in the gain characteristic of the filter are due to the resonant frequency of the low pass filter as combined with the higher resonant frequency of the high pass filter. As indicated, for a carrier frequency of 108 KHZ, with 38.4 KB modulation KHZ, the low pass filter will be tuned to 95 KHZ while the high pass filter will be tuned to 93 KHZ, giving the band pass as indicated. Only the frequencies between 19.2 KHZ and 9.6 KHZ below the carrier are passed, i.e., 108 KHZ−$f_m$ where $f_m$=9.6–19.2 KHZ.

The capacitor 30 is made to be much larger than capacitors 35 and 36 and 31. It is shown that capacitor 30 is ten times larger, but essentially could be 50 or more times larger without affecting the circuit operation.

In regard to the above, the Miller or MFM decoding is a very conventional technique and in fact such decoders can be implemented conventionally by discrete component means. MFM encoding can also be accomplished by using a microcontroller or microprocessor chip with an encode/decode program in internal Read Only Memory (ROM). The time between pulses is measured and a computer program determines whether a 1 or 0 has been transmitted. As indicated above, the present invention also may employ a unique decoding/encoding method which will be referred to as Walker Encoding and utilizes a narrow bandwidth consistent with good data reliability. The method used to accomplish Walker encoding is relatively complex and can be implemented by a microcontroller or microprocessor with the encode/decode program in ROM. In order to fully understand the system, reference is made to a series of timing diagrams depicted in conjunction with FIG. 9.

FIG. 9A thus shows a typical clock signal as for example the type of clock signal depicted in regard to FIG. 1A. FIG. 9B shows an NRZ signal which indicates a particular data format. FIG. 9C depicts the encoding scheme during a reset condition where a previous 1 has been missed. FIG. 9D shows the encoding scheme from a reset condition where a previous 0 has been missed. As indicated, the rules for formulating such a signal as depicted in FIGS. 9C and 9D are relatively complicated and will be given as follows. The rules are:

1. The normal of basic crossover occurs at 4/4 clock periods or at a period equal to normal NRZ bit period.
2. When a bit which is a zero or a one is to be repeated, the next crossover occurs 4/4 clock periods later.
3. When the bit is to change from a 1 to a 0 or a 0 to 1, the crossover occurs 5/4 clock periods later or 1¼ bit periods later.
4. After four bit changes, one bit width will have been used up resulting in a missed bit which must be restored by the circuit or the microprogram as will be explained.
5. When the bit to be missed is a 1 as indicated in FIG. 9C, no change is made in the encoding. In this manner, a 1 will be restored in the decoder program.
6. When the bit to be missed is a 0 as shown in FIG. 9D, the delay is 6/4 periods. This results in an overshoot of bit boundries of ¼ which informs the decoder a 0 is missed and resets the decoding clock to an offset of ¼ period.
7. Since a 6/4 period always indicates a 1, 0 pattern, a 6/4 period is used as a reset, or resynchronizing signal.

Figure 9:
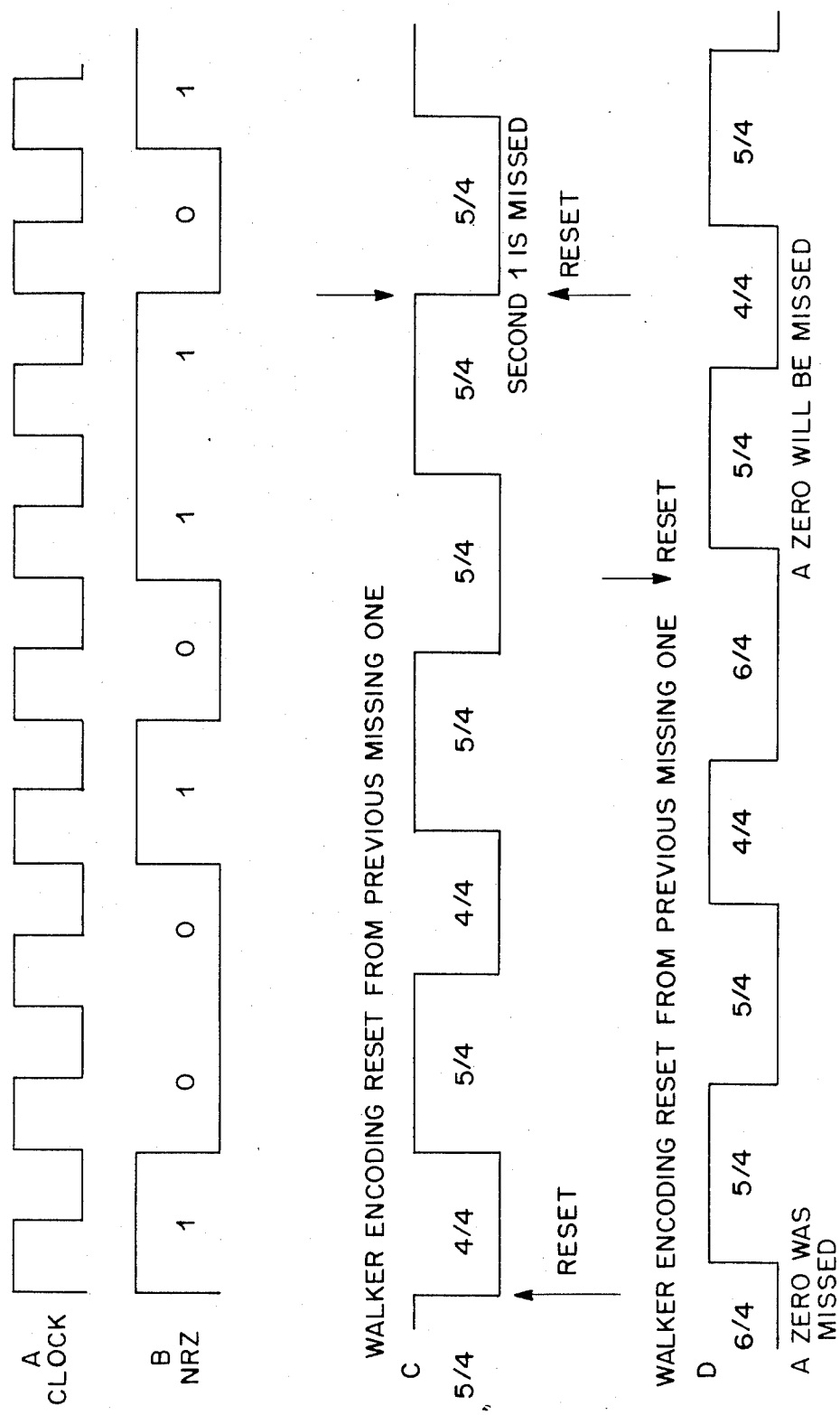
FIG. 9 is a series of timing diagrams useful in explaining an encoding scheme employed in conjunction with this invention.

As indicated, FIG. 9 shows the data encoding according to these rules. In any event, using the receiver decoders shown in FIG. 5 requires a number of carrier cycles to function properly. If the frequency is too low, there will not be a sufficient number of pulses to adequately define the gap or indicate the phase change. Each peak, if missed, results in a displacement to the next peak. For example, if there are 10 cycles in the bit period, missing one will cause a jitter of 10%.

In a system using MFM, the increments occur in five cycle jumps and the error would not be serious. According to the encoding scheme designated as Walker Encoding, the intervals would be 2.5 cycles apart and a 10% displacement could easily cause an error. Hence, one should strive to obtain the maximum number of cycles possible for a bit period. For this reason, 38.4 KB data channels are used only on the highest SCA frequencies.

The detector shown in FIG. 6 results in an improvement in this characteristic since it responds to both positive and negative drive. The use of a computer program in the microprocessor or microcontroller chip that has wide windows for the timing will further reduce the chance of error. This will be further explained.

Using the system shown generally in FIG. 2 with the Walker Encoding and 108 KHZ subcarrier, 38.4 KB data rates can be shown on spectrum analyzer to occupy 6.4 KHZ of bandwidth. This is a Nyquist factor of 6. The sideband frequencies lie between 89 and 98 KHZ and thus meet FCC requirements. AT 455 KHZ there is a sufficient number of cycles to detect and 6.4 KHZ will pass through an AM radio IF stage which is normally 10 KHZ wide. This makes the system usable for military, ham and other combination systems.

Thus, the system described utilizing the Walker Encoding provides superior operation over conventional communication systems. One experiences an improved signal to noise ratio at a reduced bandwidth plus general improvement in system sensitivity.

Figure 10:
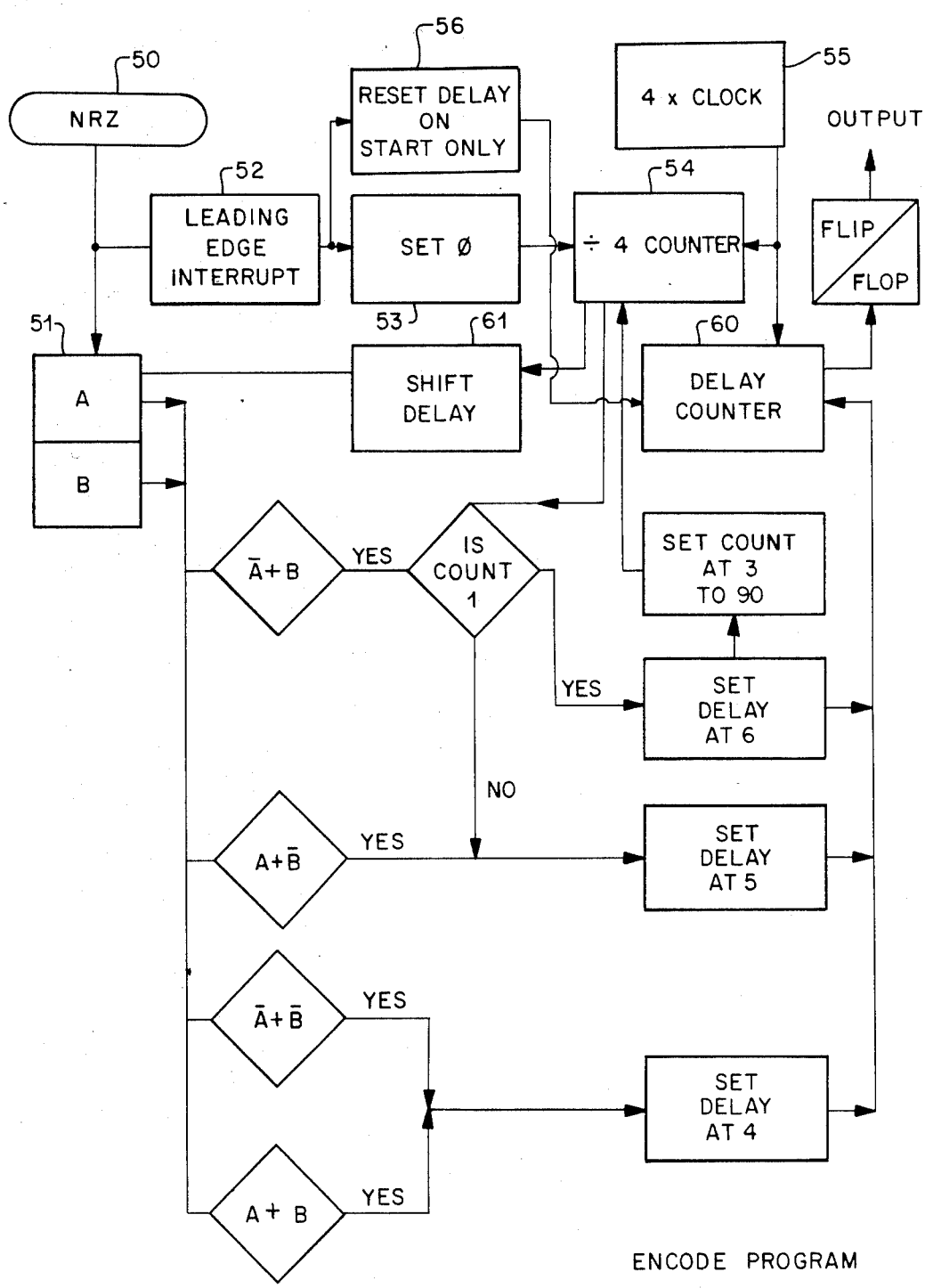
FIG. 10 is a logic diagram depicting an encode process employed by the apparatus.

Referring to FIG. 10, there is shown an encode block diagram which can also be implemented to devise a program showing the exact nature of a Walker encode system utilizing NRZ input data. NRZ data which is obtained from a conventional NRZ source 50 is applied to the input of a shift register 51 and to a leading edge detector 52. It is of course known that circuits for detecting a leading edge of a pulse are well known as circuit 52 while shift register circuits are also well known. Essentially, the NRZ data emanating from source 50 is input to the shift register 51 which holds two bits designated as A and B and which are the present and the last bit. The leading edge of the data is used to reset the counters based on detecting the leading edge via circuit 52. The leading edge of the data is used to reset various counters as will be explained. There is shown a divide by four counter 54. The divide by four counter 54 is reset on each rising edge of the data and is done via the circuit 53 which essentially is a one shot or monostable multivibrator.

A four times clock is employed which is designated by numeral 55. The clock 55 is four times the normal data clock. The output of the clock circuit is applied to a delay counter 60 as well as serving as a clock source for the divide by four counter 54. Essentially, the output from the divide by four counter is passed through a delay register 61 where it is used to clock data into the shift register 51 after the input data is stable. Various comparator circuits compare the data in the present and the last registers. If the two are the same, the delay counter 60 is set at 4 and the data crossing will occur 4 clock periods later. If they are different, the delay counter is set at 5 and the data crossing occurs 5 counts later. If the delay is A+B indicating a 1, 0 pattern and the counter has one count to go before clocking, the delay counter is set at 6/4 and the divide by four counter is reset at 3 to go before an output.

All of the above activities are timed within the microprocessor to occur at the appropriate time. It is of course understood from FIG. 10 that the entire apparatus could be conventionally implemented by hardware as indicated. The comparators are shown as diamond shaped logic modules. Essentially, each comparator as well as various set delay circuits are well known components and can be implemented by typical available integrated circuits chips such as decoders, comparators and so on.

Figure 11:
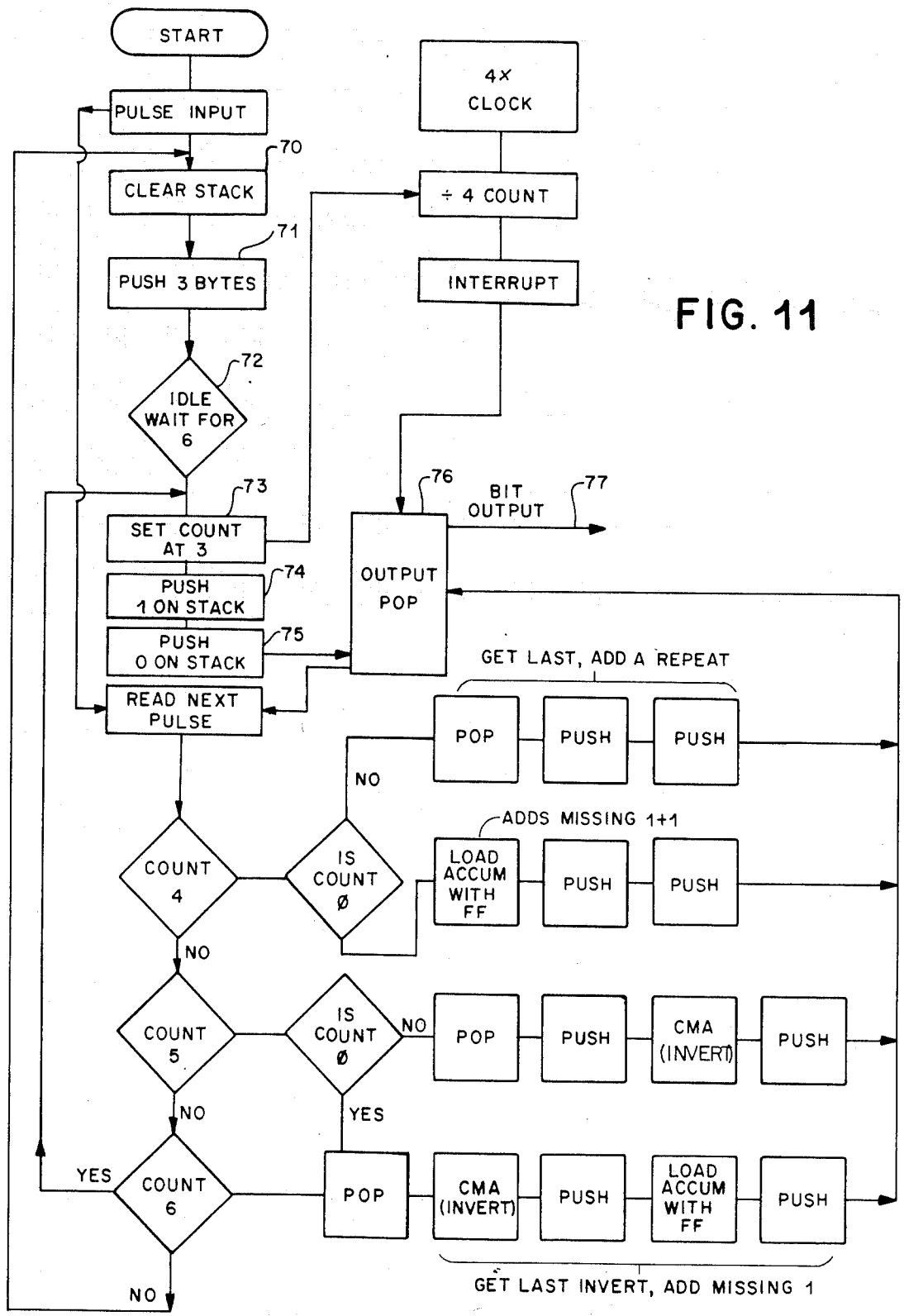
FIG. 11 is a flow chart in block diagram form depicting a decode format according to this invention.

Referring to FIG. 11, there is shown a flow chart indicative of a decode program. It is noted at the onset that the flow chart depicted in FIG. 11 can also be implemented by conventional logic circuitry. On the start of the program, the stack is cleared. The stack being a microprocessor RAM area designated as stack and three dummy characters are pushed on the stack. This is implemented by modules 70 and 71. The program then enters an idle loop waiting period as evidenced by module 72 which essentially waits for incoming pulses. On the first pulse pair spaced 6 clock pulses apart, the program proceeds and essentially the module 72 waits for such a signal. A 6 count indicates that a 1-0 pattern has been sent and the count should be at three counts to go before an output. The program sets the count and puts a 1-0 pattern on the stack. This is implemented by modules 73, 74 and 75. Future clocking will output the 1 and the 0 by popping the stack which is a conventional microprocessor technique indicated by module 76. A typical stack is 8 bits wide but only one bit is read at the output which is designated by reference numeral 77.

Having set the program at reset, the program seeks to read the next pulse. If the next pulse is spaced 4/4 period, the software determines the last bit then adds an additional bit of the same polarity. If the count is at 0, a 1 has been missed. Then a 1 is added to the stack in addition to the last bit. If the count is 5, the last bit is recalled, replaced, inverted and added to the stack. If the count is at 0, a 1 has been missed. This previous bit is inverted and replaced on the stack with the missed 1.

Because data is popped from the stack at a faster rate than added to it, and resynchronized after each four bit changes, not bits are missed. The logic and flow chart as indicated are shown in detail in FIG. 11 and essentially the decode program operates in accordance with the diagrams depicted in FIGS. 9C and 9D. Hence, the program based on the encoding reset is able to add a missing one or a missing 0.

The above-described data system as indicated enables data to be sent at efficiencies of 6 bits per HZ of bandwidth which essentially is the Nyquist also efficiency. The system is usable in all radio and cable systems but has applicable use over FM/SCA systems where up to 4 high speed data channels can be transmitted within a single FM station subcarrier space. These channels can be 38.4, 38.4, 19.2 and 19.2 KB channels, offering three times the utilization capability of the SCA spectrum when compared to a standard 38.4 KB FM/FM system with significant improvements in signal to noise.

Alternatively, four audio and one high speed data channel can occupy the space. It is also unable in communication radio systems where 38.4 KB can be passed through a standard 455 KHZ IF system. This data system enables one to obtain accurate transmission of binary data with a significantly reduced bandwidth, at the same time achieving improved signal to noise performance. Thus, it should be apparent to those skilled in the art that the system has wide applicability in all types of communication system where one desires to transmit vast amounts of digital data. One can do so by employing the system techniques at the highest possible baud rates and the lowest possible cost. Thus, the system can be used in Teletext/Videotext, stock quotes, electronic mail, and so on. Therefore, the higher the baud rate, the greater the number of services that can be provided utilizing this particular system. It should therefore be apparent to those skilled in the art that the system described above has wide spread applicability and is particularly advantageous in high speed data communication systems.

The system described above is dependent upon three basic elements (1) encoding the data, (2) a unique sideband filter, and (3) a unique phase detector that does not require a carrier. In disclosing this invention, certain obvious components and circuits have been utilized. It is obvious to those skilled in the art that other components could be substituted which will not deviate from the spirit and scope of this invention as defined by the claims appended hereto.

What is claimed is:

1. A high speed data transmission system for transmitting a binary data signal over a communications path, said binary data signal clocked at a given period, comprising:

encoding means responsive to a binary NRZ input data signal to provide at an output an encoded digital signal having time periods greater than multiples of said clock period and at a given bit rate whereby said encoded signal occupies a lesser effective bandwidth than said NRZ signal alone, said lesser effective bandwidth being ½ to ⅓ that of said NRZ signal;

balanced modulator means having an input responsive to said encoded signal and another input adapted to receive a carrier frequency signal to provide at an output a double sideband suppressed carrier signal shifting in phase 180 degrees with changes in said encoded signal;

filtering means coupled to said output of said balanced modulator to provide a narrow bandwidth less than ½ the maximum bandwidth of said sideband signal and by which said carrier frequency and low frequencies are prevented from propagating to reject all sideband frequency components which are lower than ¼ the bit rate and which are higher than ½ the bit rate of said encoded signal to provide at an output a narrow sideband signal for transmission characterized in that transitions between binary levels in said encoded signal are manifested by distinct phase changes in said single sideband signal, said filtering means operative to minimize phase distortion within the sideband signal, while passing only a part of one of said sidebands.

2. The high speed data transmission system according to claim 1, wherein said encoded digital signal has time periods of 2, 3 and 4 times said clock period, resulting in sideband frequencies of ½, ⅓ and ¼ of said clock frequency.

3. The high speed data transmission system according to claim 1, wherein said encoded digital signal has time periods of 2, 2.5 and 3 times said clock period, resulting in sideband frequencies of ½, ½.5 and ⅓ of said clock frequency.

4. The high speed data transmission system according to claim 1, wherein said filtering means comprises a first and a second parallel filter path each having a common input terminal coupled to said output terminal of said modulator, with said first filter path including a low pass filter and said second filter path including a high pass filter, with the output of said first path coupled to the output of said second path via coupling means operative to symmetrically combine the filtered outputs from said first and second paths to provide said single sideband signal, wherein said low pass filter exhibits a phase shift of relatively 90° at frequencies different from said carrier frequencies with said high pass filter exhibiting a phase shift of relatively 90° and of opposite sign to said low pass filter with both said low and high pass filters exhibiting the same numeric value phase shift at said carrier frequency, with said outputs of said filters being combined in phase to be additive in such a manner as to cancel phase changes at the output over the center pass band of the filter.

5. The high speed data transmission system according to claim 4, wherein said low pass filter comprises a first inductor having first and second terminals, with said first terminal coupled to said common input terminal and said second terminal coupled to a point of reference potential via a first capacitor to form a first resonant circuit and wherein said high pass filter comprises a second capacitor having first and second input terminals with said first input terminal coupled to said common terminal and said second terminal coupled to a point of reference potential via a second inductor to form a second resonant circuit, with said first circuit resonant at a frequency equal to or higher than the center frequency to be passed, and with said second circuit resonant at a frequency equal to or lower than the center frequency to be passed.

6. The high speed data transmission circuit according to claim 5, further according a first amplifier having an input terminal and an output terminal, with said input terminal coupled to said second terminal of said first inductor, a second amplifier having an input terminal and an output terminal, with said input terminal coupled to said second terminal of said second capacitor and means coupling said output terminals of said first and second amplifiers to one another, to cause output signals from said amplifiers to combine to pass said single sideband signal within a narrow bandwidth.

7. The high speed data transmission circuit according to claim 6, further including first means coupled to said first amplifier for controlling the gain thereof and second means coupled to said second amplifier for controlling the gain thereof, to enable the outputs to be balanced thereby obtaining maximum phase correction.

8. The highspeed data transmission circuit according to claim 6, wherein said means coupling said output terminals of said first and second amplifiers comprises a first resistor having one terminal coupled to said output terminal of said first amplifier and a second resistor having one terminal coupled to said output terminal of said second amplifier, with the other terminal of said first and second resistors coupled to one another to provide a combined output terminal for said single sideband signal.

9. The high speed data transmission circuit according to claim 5, wherein said first and second amplifiers are operational amplifiers having high input impedances at said input terminals to minimize loading to said first and second resonant circuits, and having low output impedances to permit combining of said output signals.

10. The receiving means for a high speed data transmission system according to claim 1, further comprising:
   limiting means having an input terminal responsive to said single sideband output signal for providing a limited output having a uniform level of said single sideband signal;
   phase change detecting means responsive to said limited replica signal to provide at an output a series of pulses indicative of changes in said phase angles in said single sideband signal; and
   decoding means coupled to said output of said phase change detecting means to provide a replica of said binary NRZ signal.

11. The high speed data transmission system according to claim 10, further including control means coupled to said limiting means to vary the level at which limiting occurs.

12. The high speed data transmission system according to claim 10, wherein said phase detecting means includes an OR gate having a first input coupled to said output of said limiting means, and a second input;
   a voltage controlled oscillator operative to provide at an output a signal indicative of the frequency within a narrowed single sideband signal and having said output coupled to said second input of said OR gate, to cause said gate to provide at an output a signal indicative of the phase changes in said narrowed single sideband signal, and means coupled to the output of said OR gate to control the frequency of said oscillator.

13. The high speed data transmission system according to claim 12, further including decoding means having an input coupled to said output of said OR gate to provide at an output a replica of said binary NRZ data signal.

14. The high speed data transmission system according to claim 12, further including a low pass filter coupled to said output of said OR gate.

15. The high speed data transmission system according to claim 12, wherein said OR gate is an exclusive OR gate.

16. In a high speed data transmission system for transmitting a binary NRZ data signal over a communications path, said signal transmitted as a narrow single sideband signal characterized in that there are distinct phase angle changes in said signal indicative of binary data transitions as from a zero to a one or a one to a zero, said sideband signal as transmitted being completely devoid of a carrier frequency and having only a portion of a sideband containing NRZ information in combination therewith, decoding means for such a single sideband signal, comprising:
   a limiter having an input adapted to receive said single sideband signal for providing at an output a limited version of said signal;
   a phase change detector means having an input coupled to said output of said limiter and having a voltage controlled oscillator tuned to the approximate center frequency of said sideband signal for providing a signal consisting of pulses at the output indicative of said distinct phase angle changes, and
   decoding means coupled to the output of said phase change detector means for restoring a binary NRZ data signal from said pulses.

17. A method of encoding a binary NRZ data signal at a given clock rate to a binary data output signal of a lesser bandwidth comprising the steps of:
   (a) detecting when a bit of said NRZ signal is at a given binary state;
   (b) determining whether said bit at said state is to be repeated;
   (c) providing a crossover in said data output signal 4/4 bit periods later after first detecting said bit if said bit is to be repeated;
   (d) detecting a change of said state in said NRZ signal;
   (e) providing a crossover in said data output signal 5/4 bit periods later after detecting said change in state indicative of said change,
   (f) counting the change of state in said NRZ to determine 4 changes in state;
   (g) providing an indication of 4 changes indicative of a missing bit in said output signal,
   (h) determining the binary state of said missing bit to provide a 6/4 bit period delay in said output signal for one binary state and no delay for said other binary state, and restoring said missing bit.

18. The method according to claim 17, wherein said one binary state is a binary zero with said other state being a binary one.

19. The method according to claim 17, comprising the step of detecting said 6/4 bit period delay in said binary data output signal to determine a reset condition to enable said counting step to again determine 4 changes in state.

* * * * *